W. WEILD.
MACHINE FOR MAKING FLUTED ROLLERS.
No. 50,997. Patented Nov. 14, 1865.
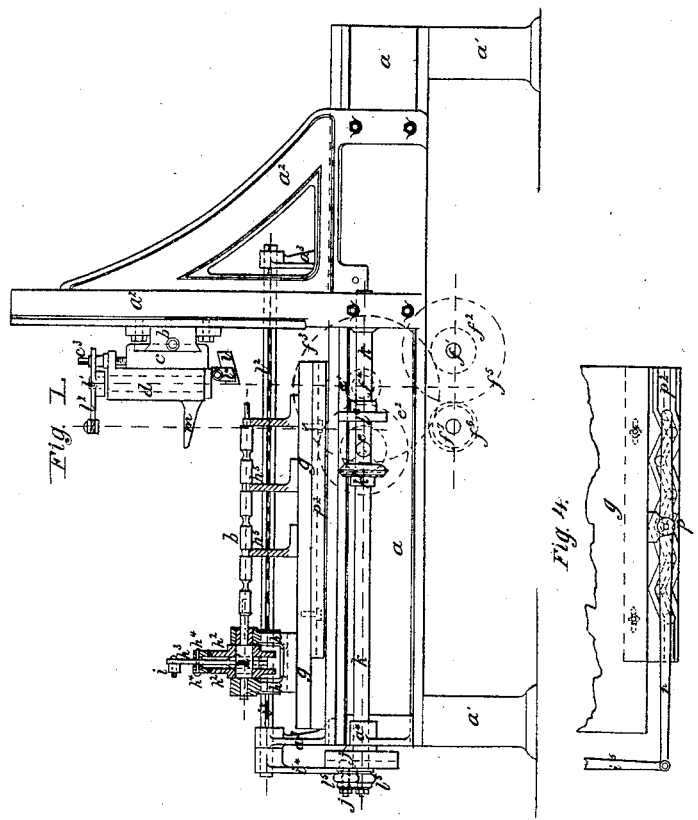
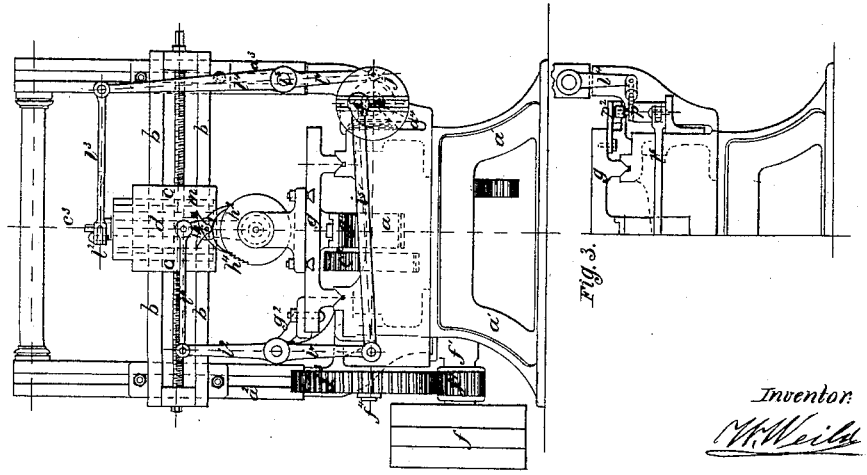
Witnesses:
Inventor:

UNITED STATES PATENT OFFICE.

WILLIAM WEILD, OF MANCHESTER, LANCASTER COUNTY, GREAT BRITAIN.

IMPROVEMENT IN MACHINERY FOR MAKING FLUTED ROLLERS.

Specification forming part of Letters Patent No. 50,997, dated November 14, 1865.

*To all whom it may concern:*

Be it known that I, WILLIAM WEILD, of the city of Manchester, in the county of Lancaster and Kingdom of Great Britain, have invented certain Improvements in the Manufacture of Fluted Rollers used in machinery for preparing, spinning, and doubling cotton, wool, flax, silk, and other fibrous materials; and I do hereby declare that the following is a full and exact description thereof, reference being had to the accompanying drawings and the letters of reference marked thereon.

I may first premise that the invention hereinafter described is part of an invention for which Letters Patent for Great Britain were granted to me under the title of "improvement in fluted rollers used in machines for preparing, spinning, and doubling cotton, wool, flax, silk, and other fibrous materials and in the manufacture of such rollers," and dated the 20th September, in the year of our Lord 1859, and that Letters Patent have aleady been granted to me in the United States for the improvements in fluted rollers, and also for one method of manufacturing such improved rollers and other fluted rollers, and the improvements hereinafter described relate to another method of making my improved diagonal fluted rollers included under my British patent; and it consists in modifying the ordinary machinery used for making straight flutes in such manner as to be able to turn the roller on its axis simultaneously with the straight end movement thereof, so that the result of the two movements is a curve of the pitch or angle required.

I may explain that in making my improved fluted rollers it is not important that the flutes should be perfectly uniform in their pitch or inclination from one of each boss to the other, so that they are inclined and the drawings of the improved machinery to be hereinafter described show two methods, one by which flutes of irregular pitch or inclination may be cut, and the other by which flutes of either regular or irregular pitch or inclination may be cut.

Figure 1 is a side elevation, parts in section; and Fig. 2, an end view of an ordinary planing-machine adapted for the manufacture of my improved fluted rollers with reversed diagonal or inclined flutes by the ordinary cutting or planing process.

The bed of the machine is marked $a$, its feet $a'$, and the upright side framing $a^2$, the cross-slideway $b$, the slide $c$, the tool-holding slide $d$, the table of the machine $g$. The driving-pulleys are marked $f$, and are placed on the first and slow-motion shaft $f'$, which drives, by a pinion, $f^2$; a wheel, $f^3$, on a shaft, $f^4$, a wheel, $f^5$, on the boss of one of the driving-pulleys $f$, on the shaft $f'$, drives a pinion, $f^6$, on the quick-motion shaft $f^7$, upon which is a pinion which also gears with the wheel $f^3$, on the shaft $f^4$. The shaft $f^4$ carries a pinion, $f^8$, which gears with the toothed rack $g'$ on the under side of the table $g$.

The parts above referred to are the ordinary and well-known parts of a planing-machine.

The roller $z$ is mounted on the table $g$ of the machine as when cutting straight flutes, and the manner of rotating the roller to cut another flute is also partly the same so far as using a ratchet-wheel and click for rotating the roller.

$h$ is a head-stock secured to the table $g$. It carries a spindle or axis, $h'$, upon which two ratchet-wheels $h^2$ are secured, and between them the fulcrum of a lever, $h^3$, which is free to oscillate on the axis or spindle $h'$. The ratchet-wheels $h^2$ have as many teeth as there are flutes intended to be cut in the roller, and they are placed on the spindle $h'$ with the teeth of one reverse to those on the other, a ratchet-click, $h^4$, jointed on one side of the lever $h^3$, taking into the teeth of one ratchet $h^2$, and another jointed on the other side of the lever $h^3$, into the teeth of the other ratchet $h^2$, the ratchets being set so that there will be no more "play" when the lever $h'$ is moved than is necessary to enable one click $h^4$ to be lifted from its ratchet-wheel. The spindle $h'$ has a square end, which fits the square hole in the end of the roller, $z$, which is supported at intervals by brackets $h^5$, secured to the table $g$. The lever $h^3$ is jointed with a rod, $i$, which is also jointed to another lever, $i^2$, on a shaft, $i^3$, which is carried by two bearings, $a^3$, secured to the bed $a$ of the machine. The shaft $i^3$ has a groove from end to end into which a key fits, which is secured in the boss of the lever $i^2$, which is slid along the shaft $i^3$ by the movement imparted to the table $g$, the boss of the lever $i^2$ being slid to and fro on the shaft $i^3$ by a bracket, $g^2$, secured to the table $g$, which bracket $g^2$ fits on each side of the boss of the lever $i^2$.

On the end of the shaft $i^3$ a lever, $i^4$, is keyed, which is jointed to one end of a rod, $i^5$, the other end being jointed on a crank-pin, $j$, which is adjustable so as to get a longer or shorter radius in a groove formed in a disk-plate, $j'$, secured on the end of a shaft, $k$, rotating in bearings $a^4$ attached to the bed $a$ of the machine. The shaft $k$ is geared by bevel-wheels $k'$ with the intermediate shaft, $e$, which, by a wheel, $e^2$, and pinion $e'$, gears with the shaft $f^4$, giving motion to the table $g$. The wheel $e^2$ and pinion $e'$ are not shown in the model, not being essential to show my invention.

The wheels gearing the two shafts $f^4$ and $e$ should be so proportioned that while the table $g$ travels over a space equal to the length of a boss and the blank space between the bosses on a roller the shaft $k$ will have made one-half a rotation, and the crank-disk $j'$ should be set so that when the connecting-rod $i^5$ arrives at what are commonly termed the "dead-points" or "centers" the point of the cutting-tool will be at the same time midway on the blank space between the bosses on the roller.

It will be seen that with the arrangement of mechanism described the shaft $i^3$ will be made to oscillate, and that its oscillations will be conveyed to the roller $z$.

The cutting-tool $l$ is similar to that usually employed for cutting straight flutes, being a thin piece of steel secured by a bolt in a slit formed in a holder, $l'$. This holder $l'$ is circular, and is placed in bearings in the tool-holding slide $c$, so that it can be freely rotated or oscillated on its axis, the point of the cutting-tool $l$ being placed in a line corresponding with the axis on which the tool-holder $l'$ oscillates. The object of this arrangement is to bring the cutting-tool in the line of the cut.

The upper end of the tool-holder $l'$ has an arm, $l^2$, fixed upon it, which is jointed to one end of a rod, $l^3$, the other end being jointed with one end of a lever, $l^4$, having its fulcrum on a stud, $l^5$, secured to the framing. The lower end of this lever $l^4$ has an anti-friction bowl upon it, which enters the groove of a double action or box-cam, $l^6$, fixed on the shaft $k$. This cam $l^6$ is formed and arranged to change the inclination of the cutting-tool $l$, as the direction changes in which the roller is made to oscillate.

The ordinary self-acting arrangements are employed for traversing the belt, by which means the movement of the table $g$ is reversed, and to this mechanism the ordinary mechanism is connected, which is employed for self-acting the vertical movements of the cutting-tool $l$, but instead of the lever being loose on the screw $c^3$ and acting by a click or a ratchet-wheel fast on the said screw, the lever is fast to the screw $c^3$, so that the reversing-gear imparts oscillating movements to it. Consequently the tool will be raised at one end and lowered at the other end of the movement of the table, this being arranged so that the tool will be down during the cutting-stroke of the table, but up so as to pass clear of the roller during the back-stroke. The roller is turned so as to cut the next flute by means of an inclined piece, $m$, fixed on the tool-holding slide $c$, which acts upon a tail-piece from one of the clicks $h^4$ working in the ratchet-wheels $h^2$, and lifts it clear of the teeth at the end of the cutting movement of the table $g$. To explain the operation of this incline piece $m$ more clearly, it may be assumed that the table $g$ has just arrived at the end of its cut, the point of the cutting-tool $l$ being half of the length of the blank space between bosses past the last boss on the roller, and that the lever $h^3$ has at the same time arrived at one of its extreme movements to the right, looking at Fig. 2. In this case the ratchet-click $h^4$ on the right will be the pushing-click and that to the left will be free and can be lifted. Now, the incline $m$ is set so as to have lifted the ratchet-click $h^4$ on the left clear of the teeth before the lever $h^3$ has completed its oscillation to the right—say by the space of a tooth and a quarter of the ratchet—consequently, when the back oscillation of the lever $h^3$ and back movement of the table $g$ commences the ratchet $h^2$ and roller $z$ will have no motion. The click on the right will lift and pass over a tooth in its ratchet and drop, and the click on the left will have passed over a tooth of its ratchet, being held up by the incline $m$, but before it can pass over another tooth it will have escaped from the incline $m$, and thus both clicks will again have hold of their ratchet-wheels, the roller having been rotated to the extent of one tooth by the operation, which will be repeated at the end of every cut. The incline of the flute produced by the crank-pin $j$ will not be uniform in pitch, but that part of it which comes upon the boss will be a sufficiently near approximation, and by the use of a crank-pin (made adjustable) the increase or decrease of the inclination is readily obtained; but if a uniform inclination is required it will be obtained by substituting a suitably-shaped cam in place of the disk and crank-pin, the cam acting on a bowl carried by a lever having its fulcrum on a stud fixed in the framing, to which lever the end of the connecting-rod $i^5$ must be jointed.

The arrangements described will be found sufficient for a large class of fluted rollers—namely, those having bosses and spaces of uniform length—but there is another arrangement of mechanism which I employ for fluting-rollers with either regular or irregular bosses or spaces, which will be illustrated by Fig. 3, a partial end view, and Fig. 4, a partial plan view. In substituting this mechanism the shafts $k$ and $e$ are dispensed with and a lever, $p$, is employed. The axis of its fulcrum, being a stud, $p'$, secured to the bed $a$, is placed in a vertical position. One end of the lever $p$ is jointed to the rod $i^5$. The other end of the lever (the fulcrum being between its two ends) carries an anti-friction bowl which works in a box-cam path, $p^2$, secured to the edge or under side and lengthwise of the table $g$. This cam-path is equal to the length of the roller to be operated upon, and is shaped with inclines of the length and pitch required by the bosses and spaces on the roller and the inclination of the required flutes. The lower end of the lever $l^4$ is connected with the said lever $p$, actuated by the cam-path $p^2$ on the side of the table $g$, so that the inclination of the cutting-tool $l$ is changed in accordance with the change in the inclination of the flute.

When rollers are to be operated upon having only one boss of considerable length, then it may be necessary to give a considerable amount of oscillating movement to the roller, in which case the lever $h^3$, clicks $h^4$, and ratchet-wheels $h^2$ must be placed on a shaft in another headstock, (but on the table $g$,) the shaft for the ratchet-wheels having a wheel fixed upon it gearing with a pinion on the spindle-axis $h'$, by which means the movements imparted to the ratchet-wheels $h^2$ will be multiplied. The shaft $k$ will only have in this case to make half a rotation for the length of the one boss and proportionate space at each end.

It will be readily understood that several rollers may be placed end to end (the table of the machine being long enough) and that there may be several head-stocks $h$ and cutting-tool slides, according to the width of the machine, all actuated from the same sources by merely adding connecting mechanism, which can readily be accomplished by a mechanic conversant with this class of machines.

What I claim as my invention, and desire to secure by Letters Patent of the United States, is—

So constructing and arranging the machine as to give the roller which is being fluted both a rotary and a vibratory motion by the devices herein described, and for the purpose described.

W. WEILD.

Witnesses:
PETER J. LINSEY,
HY. W. LORD.